United States Patent [19]

Mangone, Jr.

[11] Patent Number: 5,057,000
[45] Date of Patent: Oct. 15, 1991

[54] APPARATUS FOR MOLDING SEQUENTIALLY IDENTIFIED PRODUCTS

[76] Inventor: Peter G. Mangone, Jr., 28600 Buchanan Dr., Evergreen, Colo. 80439

[21] Appl. No.: 541,833

[22] Filed: Jun. 21, 1990

[51] Int. Cl.$^5$ .............................................. B29C 33/00
[52] U.S. Cl. ................................. 425/190; 249/103; 249/104; 425/192 R
[58] Field of Search ............... 249/103, 104; 425/183, 425/185, 188, 190, 192 R

[56] References Cited

U.S. PATENT DOCUMENTS

| | | | |
|---|---|---|---|
| 4,137,962 | 2/1979 | Pol | 249/103 |
| 4,254,933 | 3/1981 | Netto | 249/103 |
| 4,314,505 | 2/1982 | Krembel, Jr. | 101/29 |
| 4,342,549 | 8/1982 | Lemelson | 425/183 |
| 4,379,687 | 4/1983 | Wilson et al. | 249/103 |
| 4,384,702 | 5/1982 | Boskovic | 249/103 |
| 4,708,314 | 11/1987 | Kühling | 249/103 |

Primary Examiner—Timothy Heitbrink
Attorney, Agent, or Firm—Klass & Law

[57] ABSTRACT

Apparatus for forming molded products and providing each product with identifying indicia in sequence during the molding operation using at least two mold parts forming a plurality of molding cavities with an identification forming apparatus as an integral part of each of the cavities, each of the identification forming apparatuses having a plurality of rotatable members, each of which has a plurality of circumferentially spaced apart indicium forming members each of which is different and moving at least one of the rotatable members one increment to the next identifying indicium during each molding cycle.

15 Claims, 3 Drawing Sheets

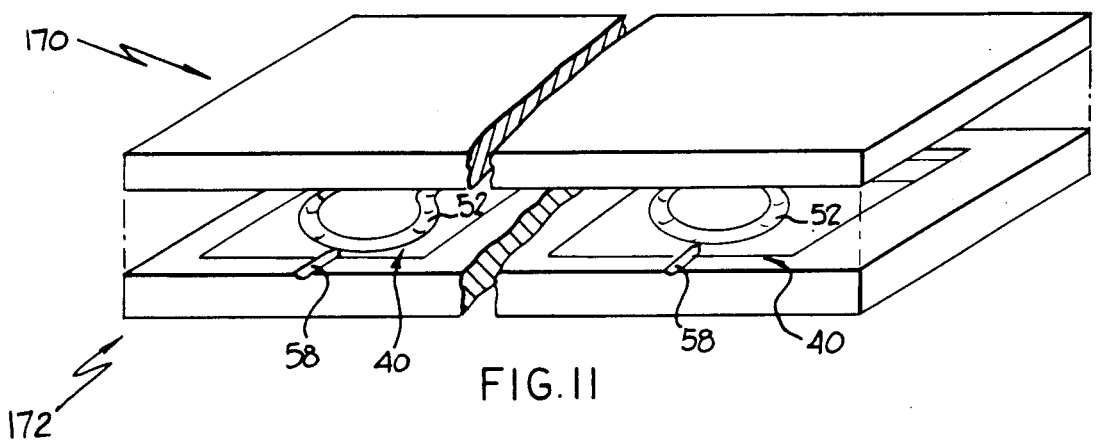
FIG.11
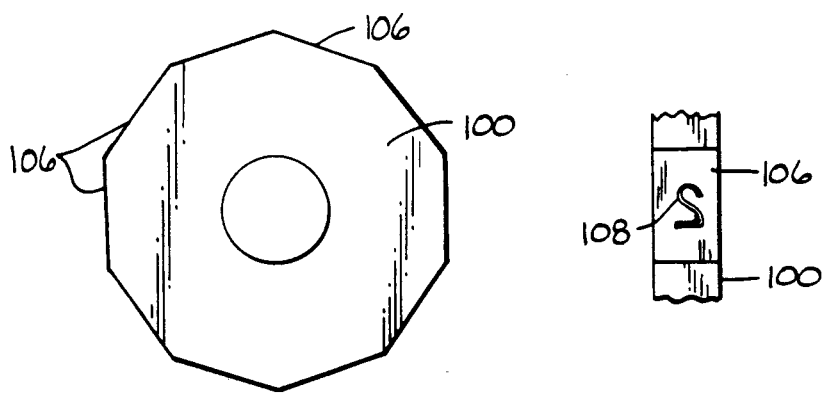
FIG.12
FIG.13
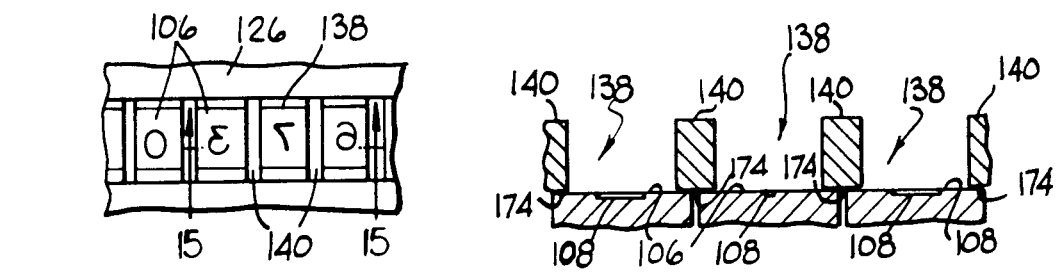
FIG.14
FIG.15
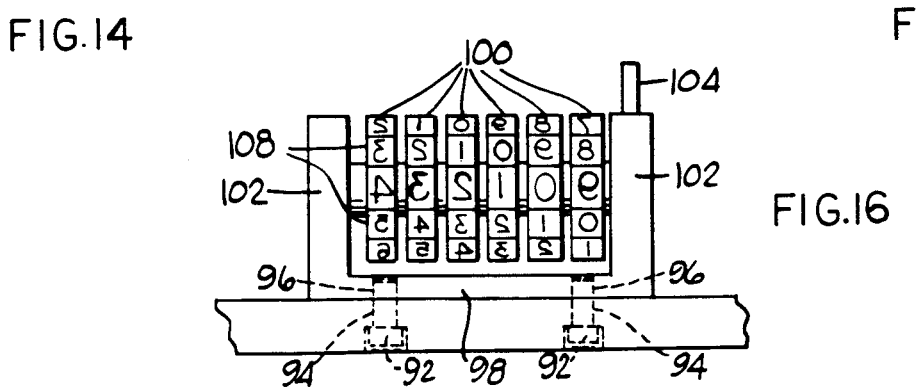
FIG.16

APPARATUS FOR MOLDING SEQUENTIALLY IDENTIFIED PRODUCTS

FIELD OF THE INVENTION

This invention relates generally to the injection molding of products and more particularly to the molding of products which are provided with identifying indicia during the molding operation.

BACKGROUND OF THE INVENTION

In the molding of products, such as injection molding of plastic products, it is sometimes desirable to be able to provide such products with identifying indicia during the molding operation. In U.S. Pat. No. 4,254,933, there is disclosed an injection molding operation wherein a plurality of security seals are molded during each molding operation. The plurality of molded security seals are provided with identifying indicia and are produced without repetitions but numerical sequence. In U.S. Pat. No. 4,137,962, a movable member is located in a casting-marking apparatus which is adapted for incorporation in a permanent foundry pattern of the type used to produce sand molds for initial castings. The apparatus carries a marking that is impressed in the sand mold and subsequently reproduced on a casting. The marking is altered from a station remote from the pattern. The marking is used to mark castings with information that periodically changes such as the hour at which the casting is made.

BRIEF DESCRIPTION OF THE INVENTION

This invention provides molding apparatus for forming a plurality of molded products during each molding cycle wherein each molded product is provided with identifying indicia in sequence during each molding cycle and subsequent successive molding cycles.

In a preferred embodiment of the invention, the molding apparatus comprises at least two mold parts that are movable between opened and closed positions. The mold parts have mating surfaces which define therebetween a plurality of molding cavities and at least one injection channel opening into each of the molding cavities to form a plurality of molded products during each molding cycle. The apparatus can be used with any flowable molding material but is preferably used with plastic materials such as nylon, polyethylene, acetal or other materials having similar characteristics. Identification forming means, such as a wheel type numbering device, are mounted on one of the mold parts so that each cavity has an identification forming means that becomes an integral part of the cavity. Each of the identification forming means comprises a plurality of rotatable members each of which has an outer surface having a plurality of circumferentially spaced apart indicium forming means for forming one of the identifying indicia. Moving means are located adjacent to the cavity and rotate at least one of the rotatable members by increments so that its indicium forming means are presented one by one to the molding cavity and to rotate the next adjacent rotatable member after the one of the rotatable members has been rotated through one complete revolution. Actuating means are provided to actuate the moving means by an increment during each cycle of operation of said at least two mold parts. One of the at least two mold parts has a plurality of linearly extending recesses formed therein with each of the recesses having a base portion and a sidewall portion. The identification forming means are fixedly mounted within the recesses. A movable member having at least a portion of one of said mating surfaces formed thereon is mounted for movement toward or away from said base portion. The movable member is in an opened position when the at least two mold parts are in an opened position and in a closed position when the at least two mold parts are in a closed position. The movable member has a plurality of linearly spaced apart openings formed therein. Guide means are provided for guiding the movement of the movable member so that, when the at least two mold parts are in the closed molding relationship, one of the indicium forming means is associated with one of the openings. The actuating means comprise a movable stem portion connected to the identification forming means, so that the movable member moves the movable stem portion as the movable member moves between the opened and closed positions. The movable member comprises two separate sections which are resiliently urged away from each base portion. Stop means are provided for limiting the movement of the two separate sections away from the base portion. The guide means comprise a plurality of threaded openings formed in the bottom surface of each of the separate sections facing the base portion. The base portion has a plurality of openings extending therethrough. A plurality of shoulder bolts are provided with each of the shoulder bolts having a threaded end portion, a central body portion having a cross-sectional configuration similar to the cross-sectional configuration of each of the passageway so to permit sliding guided movement of the shoulder bolt through the passageway and an enlarged head portion to prevent entry of each of the shoulder bolts into the passageways as to limit the movement of the sections. Each of the openings has an inner surface, a longitudinal axis and an axial extent. Each of the indicium forming means has an outer surface having a cross-sectional configuration that is slightly larger than the cross-sectional configuration of the inner surface. The portion of the indicium forming means facing the opening has an exposed surface and the exposed surface has a recess formed therein in the shape of the indicium. When the two mold parts are closed, the indicium forming means abuts against the surface of the section surrounding the opening to close the opening that it is associated with to form a molding cavity.

In one preferred operation of the molding apparatus, the two mold parts have mating surfaces to define ten molding cavities therebetween. The indicium forming means have recesses in the exposed surface thereof to form the numbers 0, 1, 2, 3, 4, 5, 6, 7, 8 and 9 so that each molded product will have identifying indicia thereon ending with one of these numbers. There are five rotatable members having the numbers thereon and one fixed member having the indicia thereon. During the first molding operation, the exposed surface of the five rotatable members will have the number zero formed therein and the fixed member in each of the ten cavities will have the numbers 0–9 in sequence thereon. After the first ten molded products have been formed, as the two mold parts move from the closed to the opened position, the rotatable member next adjacent to the fixed member in each of the cavities, is indexed so that the exposed surface of each of the movable members will have the number one formed therein. Therefore, the first ten molded products will be numbered in sequence from zero to nine, and the next ten molded products will be numbered in sequence from ten to nineteen. This will be repeated until the number "999999" is reached. At that time, another fixed wheel can be added with the exposed surface of each indicium forming means having the letter "A" formed therein. The sequential identification would then proceed to the number 999999A. Also, if desired, more than ten cavities could be provided such as twenty-six cavities and the indicium forming means could be provided with the letters "A" through "Z". The indicium forming means can be provided with any character but will always form identifying indicia in sequence and without repetition.

BRIEF DESCRIPTION OF THE DRAWINGS

An illustrative and presently preferred embodiment of the invention is shown in the accompanying drawings in which:

FIG. 11 is a perspective view of two mold parts with molding inserts having mating surfaces to form a plurality of molding cavities therebetween;

FIG. 12 is a side elevational view of one of the rotatable members;

FIG. 13 is a plan view of a portion of the rotatable member of FIG. 12;

FIG. 14 is a top plan view of a portion of the other mold part in FIG. 4;

FIG. 15 is a cross-sectional view taken on the line 15—15 of FIG. 14; and

FIG. 16 is a side elevational view of identification forming means.

DETAILED DESCRIPTION OF THE INVENTION

Figure 2:
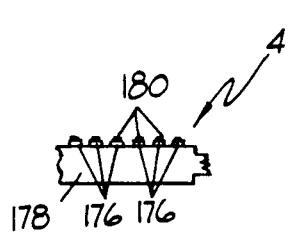
FIG. 2 is a side elevational view of a portion of the molded product of FIG. 1.
Figure 1:
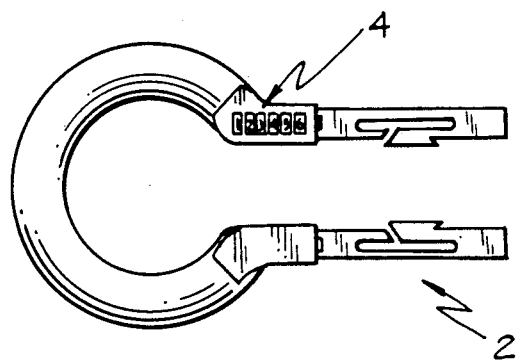
FIG. 1 is a top plan view of a molded product having identifying indicia integrally molded thereon.

In FIGS. 1 and 2, there is illustrated a molded product 2 having integrally molded identifying indicia 4 thereon. The product is the link portion of a lock.

Figure 3:
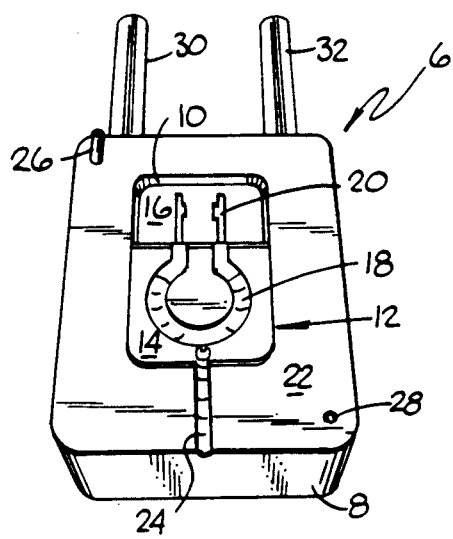
FIG. 3 is a perspective view of one of two mold parts with a molding insert having a surface having one portion of a molding cavity formed therein.

In FIG. 3, there is illustrated one mold part 6 for holding one of two molding inserts which are used to form the molded product of FIG. 1 as described below. The one mold part 6 has a body portion 8 having a recess 10 formed therein. One molding insert 12 of the two mold parts is mounted in the recess 10 and has surfaces 14 and 16 having portions 18 and 20 of a molding cavity, described below, formed therein. The one molding insert 12 is illustrated as a one part molding insert but could comprise two or more parts. In this embodiment, the surface 14 lies generally in the plane slightly above the surface 22 of the body portion 8 and the surface 16 is located within the recess 10. An injection channel 24 is formed in the surfaces 14 and 22 and opens into the portion 18. A guide rod 26 projects outwardly from the surface 22 and a guide opening 28 extends downwardly into the body portion 8 for purposes described below. Tubes 30 and 32 are provided for passing coolant through the body portion 8.

Figure 4:
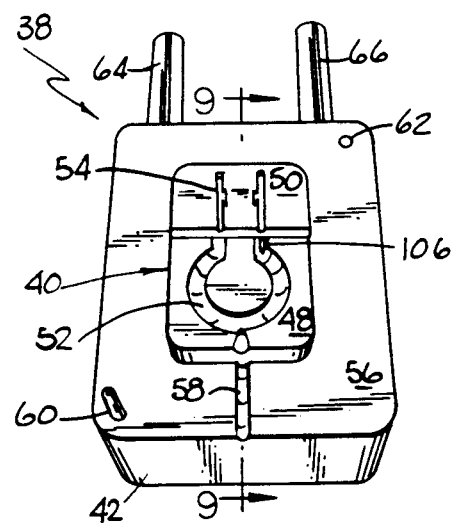
FIG. 4 is a perspective view of the other of two mold parts with molding inserts having a surface having the other portion of the molding cavity formed therein.
Figure 5:
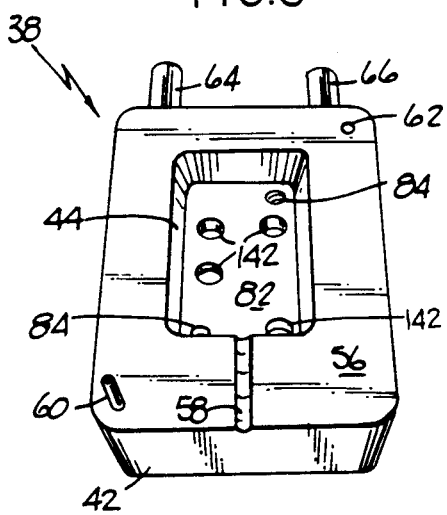
FIGS. 5-7 are perspective views of the components forming the other of the two mold parts in FIG. 4.

In FIG. 4, there is illustrated another mold part 38 for holding the other molding insert 40 of the two mold parts. As illustrated in FIG. 5, the another mold part 38 has a body portion 42 having a recess 44, formed therein. The other molding insert 40 of the two mold parts 6 and 38 is mounted in the recess 44 and has surfaces 48 and 50 having portions 52 and 54 which cooperate with portions 18 and 20 to form a molding cavity when the surfaces 14 and 16 are mated with the surfaces 48 and 50. In this embodiment, the surface 50 is spaced further from the surface 56 of the body portion 42 than the surface 48. An injection channel 58 is formed in the surfaces 56 and 48 and opens into the portion 52. A guide rod 60 projects outwardly from the surface 56 and a guide opening 62 extends downwardly into the body portion 42 and these cooperate with the guide rod 26 and opening 28 to ensure the proper mating relationship of the surfaces 14, 16, 48 and 50. Tubes 64 and 66 are provided for passing coolant through the body portion 8. Conventional means (not shown) are provided to move the mold parts 6 and 38 between a closed position wherein the surfaces 14, 16, 48 and 50 are in mating relationship to form a molding cavity so that flowable molding material may be injected into the cavity to form a molded product and an opened position so that the molded product may be removed.

Figure 6:
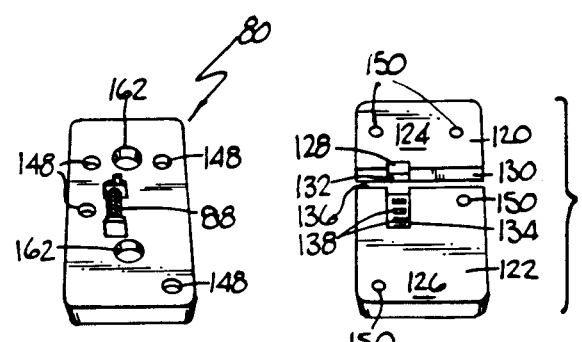
Figure 7:
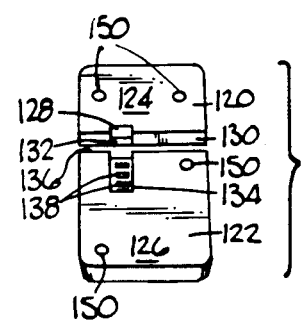
Figure 8:
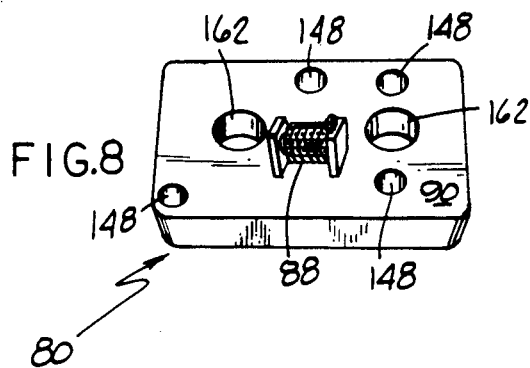
FIG. 8 is a perspective view from the left side of FIG. 6.

The various components of the mold part 38 are illustrated in FIGS. 5-8. In FIGS. 6 and 8, there is illustrated a block member 80 which is mounted on the base surface 82 of the recess 44 by headed threaded bolts 83, FIG. 9, passing through openings 84 in the body portion 42 and threaded into threaded openings 86 in the block member 80. Identification forming means 88 are mounted on the surface 90 of the block member 80 by suitable means, such as headed threaded bolts 92, FIG. 16, passing through openings 94 in the block member 80 and threaded into threaded openings 96 in the bottom portion 98 of the identification forming means 88 which are similar to the numbering machines manufactured by Paul Leibinger GmbH and Co. KG, and modified to change raised ind markings to recessed indicium markings. The identification forming means 88 comprises six members 100 five of which are rotatably mounted on the support posts 102 extending upwardly from the bottom portion 98. A movable stem portion 104 is mounted for reciprocal linear movement in one of the support posts 102 and each time it is reciprocated, it indexes at least one of the rotatable members one increment as described more fully below. The movable stem portion 104 is resiliently urged in a direction away from the support post 102. As illustrated in FIGS. 12, 13 and 15, each rotatable member 100 has a peripheral surface comprising ten flat portions 106 in each of which there is formed an indicium forming recess 108.

Figure 9:
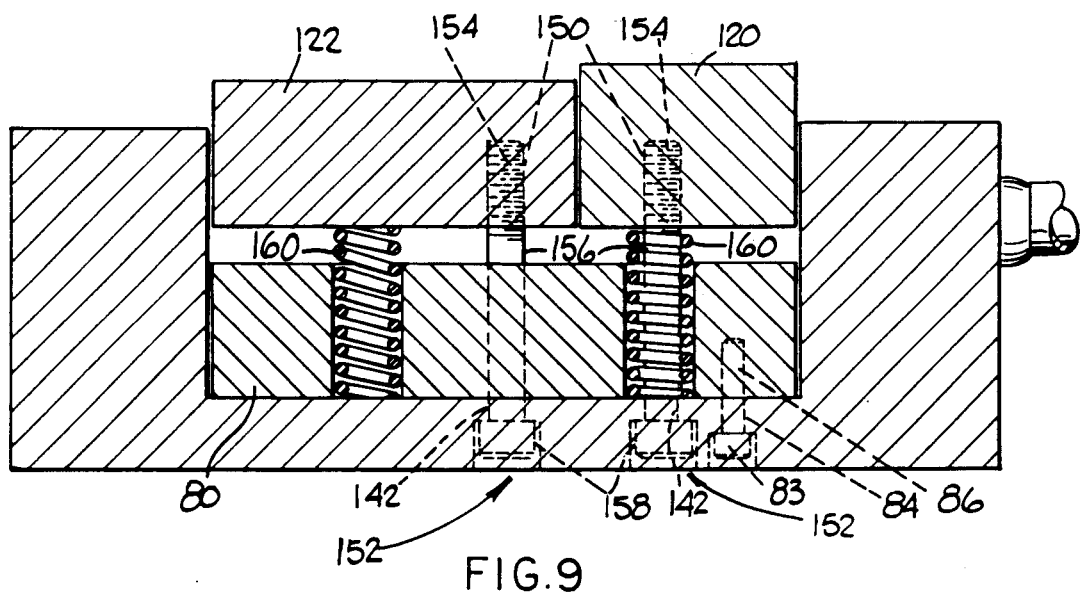
FIG. 9 is a cross-sectional view taken on the line 9—9 of FIG. 4.
Figure 10:
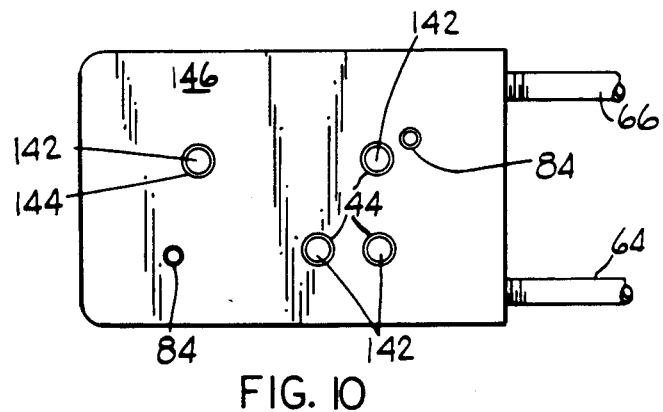
FIG. 10 is a bottom plan view of FIG. 5.

The other molding insert 40 comprises two sections 120 and 122, FIGS. 7 and 9, having bottom surfaces 124 and 126. A recess 128 is formed in the bottom surface 124 and the sidewall 130 to form an abutment shoulder 132 which, as described below, is adapted to contact and move the movable stem portion 104 as the mold parts 6 and 38 are moved between the closed and opened positions. A recess 134 is formed in the bottom surface 126 and the sidewall 136 and a plurality of openings 138 are formed in the portion of the section 122 forming a wall of the recess 134 and, as illustrated in FIGS. 14 and 15, are defined by a plurality of spaced apart bars 140.

The sections 120 and 122 are mounted for reciprocal movement in linear directions and are in the position illustrated in FIG. 9 when the mold parts 6 and 38 are in the opened position. The mounting means for permitting movement of the sections 120 and 122 are illustrated in FIGS. 5-10. The mold part 38 is provided with a plurality of openings 142 having abutment flanges 144 which openings 142 extend through the bottom surface 146 and the base surface 82. The block member 80 has a plurality of openings 148 extending therethrough and when mounted in the recess 44, the openings 142 and 148 are in alignment. The sections 120 and 122 have threaded openings 150 extending inwardly from the bottom surfaces 124 and 126 and are in alignment with the openings 142 and 148. Shoulder bolts 152, each having a threaded end portion 154, a central body portion 156 and an enlarged head portion 158, pass through each of the aligned openings 142 and 148 and are threaded into each of the threaded openings 150. Resilient springs 160 are located in openings 162 in t he block member 80 and extend outwardly therefrom and contact the bottom surfaces 124 and 126 to urge the sections 120 and 122 away from the block member 80. The enlarged head portions 158 of the shoulder bolts 152 contact the abutment flanges 144 to limit the movement of the sections 120 and 122 away from the block member 80.

A presently preferred embodiment of the invention is illustrated in FIG. 11. One mold part 170 has ten molding inserts mounted therein, each one similar to the one molding insert 12 of FIG. 3 and another mold part 172 has ten molding inserts mounted therein, each one similar to the other molding inserts 40 of FIG. 4. When the mold parts 170 and 172 are in the closed position, the mating surfaces 14, 16, 48 and 50 form ten molding cavities. As stated above relative to mold parts 6 and 38, conventional means (not shown) move the mold parts 170 and 172 between closed and opened positions, and conventional means (not shown) inject flowable molding materials into each of the molding cavities. The illustrations in FIGS. 9 and 16 are when the mold parts 170 and 172 are in the opened position. In the preferred embodiment, the mold part 172 is stationary and the mold part 170 is moved between the closed and opened positions. As the mold part 170 moves toward the mold part 172, the abutment shoulder 132 contact the movable stem portion and moves it into the support post 102. The surfaces 14 and 16 move into contact with the surfaces 48 and 50 and move the sections 120 and 122 toward the block member 80. When the housing 170 has reached the closed position, as illustrated in FIGS. 14 and 15, the bottom surfaces 174 of the bars 140 are in surface to surface contact with the surfaces 106 on the rotatable members 100. The surfaces 22 and 56 are slightly spaced apart to ensure the surface to surface contact of the molding inserts 12 and 40. During the molding operation, the flowable molding material flows into the openings 138 and into the recess 108 to form the identifying indicia 4. In FIG. 2, there is illustrated the portion of the molded product 2 having the integral identifying indicia 4 formed thereon. A plurality of integral projections 176 extend outwardly from the body portion 178 with an identifying indicium 180 extending outwardly from each projection 176. After the molded product 2 has been formed, the mold part 170 is moved away from the mold part 172. As the mold part 170 moves, resilient means in the post 102 move the movable stem portion 104 outwardly to rotate at least one of the rotatable members 100 to move the surface 106 having the next sequential indicium forming means thereon into position for the next molding operation. As the mold part 170 moves, the resilient spring 160 moves the section 122 away from the blook member 80 to provide space for the rotatable member 100 to move. As explained above, the indicia illustrated in the drawings are numbers, but other forms of indicia may be used.

In the embodiment illustrated in the drawing, the first rotatable member 100 next to the movable stem portion is rotated to a desired indicium and then fixed in position. The ten molding inserts 40 in the mold 172 would be set with the indicia 0-9 in sequence and the other five rotatable members 100 would be positioned at the zero "0" location. After the first ten products have been molded, the second rotatable member 100 next to movable stem portion in each mold will be indexed to move the number "1" into position to identify molded products 10 through 19. This sequence is followed until the number 999999 has been reached. After that, another rotatable member 100 can be added and positioned next adjacent to the movable stem portion 104 and be provided with indicium forming means to produce the first ten letters of the alphabet, A-J. Molded products would then be identified in sequence from 000000A to 999999J.

It is contemplated that the inventive concepts herein described may be variously otherwise embodied and it is intended that the appended claims be construed to include the alternative embodiments of the invention except insofar as limited by the prior art.

What is claimed is:

1. Molding apparatus comprising:
    at least two mold parts separable after each molding operation and having mating surfaces which define therebetween at least one molding cavity and at least one injection channel opening into said at least one molding cavity for forming at least one molded product;
    identification forming means as an integral part of said at least one cavity for forming identifying indicia on said at least one molded product;
    said identification forming means comprising a plurality of rotatable members;
    each of said rotatable members having an outer surface, said outer surface having a plurality of circumferentially spaced apart indicium forming means for forming one of said identifying indicia;
    each of said indicium forming means forming a different indicium;
    moving means located adjacent to said at least one cavity for rotating at least one of said rotatable members by increments so that said indicium forming means on said outer surface are presented one by one to said molding cavity and to rotate another of said rotatable members after said at least one one of the said rotatable members has been rotated through one complete revolution; and
    actuating means to actuate said moving means by an increment during each cycle of operation of said at least two mold parts.

2. Molding apparatus comprising:
    at least two mold parts separable after each molding operation and having mating surfaces which define therebetween a plurality of molding cavities and at least one injection channel opening into each of said molding cavities for forming a plurality of molded products;

identification forming means as an integral part of each of said cavities for forming identifying indicia on said molded products;

said identification forming means comprising a plurality of rotatable members;

each of said rotatable members having an outer surface, said outer surface having a plurality of circumferentially spaced apart indicium forming means for forming one of said identifying indicia;

each of said indicium forming means forming a different indicium;

moving means located adjacent to each of said cavities for rotating at least one of said rotatable members in each of said cavities by increments so that said indicium forming means on said outer surface are presented one by one to said molding cavities and to rotate another of said rotatable members after said one of the said rotatable members has been rotated through one complete revolution; and actuating means to actuate said moving means by an increment during each cycle of operation of said at least two mold parts.

3. The invention as in claims 1 or 2 wherein:

said actuating means and each rotatable member cooperate so that said identifying indicia on said molded products can be formed in successive cycles of operation in monotonic sequence.

4. The invention as in claim 3 wherein:

one of said at least two mold parts having a plurality of linearly extending recesses formed therein, each of said recesses having a base portion and a sidewall portion;

said identification forming means fixedly mounted within each of said recesses;

at least one movable member in each of said recesses having at least a portion of one of said mating surfaces formed thereon;

movement permitting means for mounting said at least one movable member for movement toward or away from said base portion;

said movable member being in an opened position when said at least two molded parts are in an open position and in a closed position when said at least two mold parts are in a closed position;

said movable member having a plurality of linearly spaced apart openings formed therein; and guide means for guiding said movement of said movable member so that, when said at least two mold parts are in said closed position, at least one of said indicium forming means is located in each of said openings.

5. The invention as in claim 4 wherein said actuating means comprise:

a movable stem portion connected to said identification forming means; and said movable member moving said movable stem portion as said movable member moves between said opened and closed positions.

6. The invention as in claim 5 wherein:

said actuating means rotates one of said rotatable members one increment as said movable member moves from said closed to said opened position.

7. The invention as in claim 6 wherein said movable member comprises:

two separate sections.

8. The invention as in claim 7 and further comprising:

resilient means for urging said separate sections away from said base member; and stop means for limiting the movement of said sections away from said base member.

9. The invention as in claim 8 wherein:

said resilient means extend outwardly from said base member.

10. The invention as in claim 4 wherein said guide means comprise:

said at least one movable member having a surface facing said base portion, said surface having a plurality of threaded openings formed therein;

said base portion having a plurality of passageways extending therethrough and having a cross-sectional configuration;

said mold part having a plurality of openings formed therein;

a plurality of shoulder bolts;

each of said shoulder bolts having a threaded end portion, a central body portion and an enlarged head portion to prevent entry of said enlarged head portion into said opening; and each of said shoulder bolts passing through one of said openings in said mold part and one of said passageways in said base portion and being secured in one of said threaded openings in said movable member.

11. The invention as in claim 4 and further comprising:

each of said openings having an inner surface, a longitudinal axis and an axial extent;

a surface of said movable member having portions surrounding each of said openings;

each of said indicium forming means having an outer surface facing one of said openings and having a cross-sectional configuration slightly larger than the cross-sectional configuration of said inner surface; and said indicium forming means being in continuous contacting relationship with said portions of said surface surrounding each of said openings when said mold parts are in said closed position.

12. The invention as in claim 11 and further comprising:

said exposed surface having a recess formed therein in the shape of said different indicium.

13. The invention as in claim 12 wherein said movable member comprises:

two separate sections.

14. The invention as in claim 13 and further comprising:

resilient means for urging said separate sections for movement away from said base member; and stop means for limiting said movement of said sections away from said base member.

15. The invention as in claim 14 wherein said actuating means comprise:

a movable stem portion connected to said identification forming means;

one of said sections moving said movable stem portion as said one of said sections is moved between said opened and closed positions; and said actuating means rotating one of said rotatable members as said one of said sections moves from said closed to said opened position.

* * * * *